(12) United States Patent
Doleh et al.

(10) Patent No.: US 7,419,366 B2
(45) Date of Patent: Sep. 2, 2008

(54) APPARATUS FOR STORAGE OF POTENTIAL ENERGY

(75) Inventors: Z K Doleh, Dubai (AE); R. Z. Doleh, Dubai (AE); John Douglas Lock, Edinburgh (GB)

(73) Assignee: Zakaria Khalil Doleh, Dubai (AE)

( * ) Notice: Subject to any disclaimer, the term of this patent is extended or adjusted under 35 U.S.C. 154(b) by 944 days.

(21) Appl. No.: 10/276,022

(22) PCT Filed: May 14, 2001

(86) PCT No.: PCT/EP01/05484

§ 371 (c)(1),
(2), (4) Date: Jun. 2, 2003

(87) PCT Pub. No.: WO02/14687

PCT Pub. Date: Feb. 21, 2002

(65) Prior Publication Data

US 2004/0031265 A1 Feb. 19, 2004

(30) Foreign Application Priority Data

May 12, 2000 (NL) .................................. 1015196

(51) Int. Cl.
*F04B 17/00* (2006.01)
*F04B 17/02* (2006.01)
*F03B 13/10* (2006.01)
*F03B 13/18* (2006.01)

(52) U.S. Cl. .................. 417/333; 417/330; 290/53; 60/497

(58) Field of Classification Search .................. 417/330, 417/331, 333; 60/495, 497; 290/53
See application file for complete search history.

(56) References Cited

U.S. PATENT DOCUMENTS

| 696,982 | A | * | 4/1902 | Lauter .......................... 417/330 |
| 1,342,318 | A | | 6/1920 | Yanacopoulos |
| 1,485,574 | A | | 3/1924 | Viora |
| 3,970,415 | A | | 7/1976 | Widecrantz et al. |
| 4,103,490 | A | | 8/1978 | Gorlov |
| 4,108,579 | A | | 8/1978 | Martinez et al. |
| 4,111,610 | A | | 9/1978 | Brown |
| 4,462,762 | A | | 7/1984 | Palani |
| 4,496,846 | A | | 1/1985 | Parkins |
| 4,683,720 | A | * | 8/1987 | De Shon ....................... 60/496 |
| 4,719,754 | A | * | 1/1988 | Nishikawa .................... 60/501 |

(Continued)

FOREIGN PATENT DOCUMENTS

DE 215657 C 6/1907

(Continued)

*Primary Examiner*—Charles G Freay
(74) *Attorney, Agent, or Firm*—The Webb Law Firm

(57) ABSTRACT

An apparatus for storage of potential energy using water from a deep body of water is described. The apparatus comprises one module including a cylinder, a piston slidably connected to the cylinder, a column for storing the water from the deep body of water received through an inlet being in communication with the cylinder/piston, and a connecting tube which mutually connects the cylinder and the column. The apparatus further comprises driving means for reciprocally displacing the piston in relation to the cylinder, wherein the driving means is a crankshaft drivingly connected to the piston and at least one flywheel mounted to the crankshaft for counteracting the pressure as result of the water stored in the column.

12 Claims, 3 Drawing Sheets

U.S. PATENT DOCUMENTS

| | | | |
|---|---|---|---|
| 4,720,976 A * | 1/1988 | Kim et al. | 60/495 |
| 4,914,915 A * | 4/1990 | Linderfelt | 60/502 |
| 5,027,000 A * | 6/1991 | Chino et al. | 290/53 |
| 5,066,867 A * | 11/1991 | Shim | 290/53 |
| 6,023,105 A | 2/2000 | Youssef | |

FOREIGN PATENT DOCUMENTS

| | | |
|---|---|---|
| EP | 307517 A | 3/1989 |
| FR | 2334840 A | 7/1977 |
| GB | 250209 A | 11/1926 |
| GB | 751184 A | 6/1956 |
| GB | 2068469 A | 8/1981 |
| WO | WO 9841758 A | 9/1998 |

\* cited by examiner

APPARATUS FOR STORAGE OF POTENTIAL ENERGY

BACKGROUND OF THE INVENTION

The present invention relates to an apparatus for storage of potential energy using water from a deep body of water, comprising at least one module which module comprises a cylinder, a piston slidably connected to the cylinder, a column for storing the water from the body of water received through an inlet being in communication with the cylinder/piston, and a connecting tube which mutually connects the cylinder and the column, and wherein the apparatus further comprises driving means for reciprocally displacing the piston in relation to the cylinder.

Such an apparatus is known from the British Patent Application No. 2 068 469. The driving means of this known apparatus consists of a buoy which is secured to the piston for reciprocating motion thereof. The buoy moves freely up and down on the waves of the sea in which the apparatus is applied. This known apparatus has a disadvantage in that the buoy is not capable of generating sufficient force to push the piston downwards, or at least to push the piston downwards with a sufficiently large stroke to displace the water to the column. Therefore, this apparatus is not very efficient.

SUMMARY OF THE INVENTION

The object of the invention is to provide an apparatus for storage of potential energy which uses water from a deep body of water, e.g. a sea, which apparatus is more efficient than the apparatus known from the prior art.

This is achieved according to the invention by an apparatus which is characterized in that the driving means comprises a crankshaft drivingly connected to the piston and at least one flywheel being mounted to the crankshaft for counteracting the pressure as result of the water stored in the column. With the crankshaft and the flywheel(s) an extra momentum, or force, can be created to counteract the pressure head in the column. Thereby the crank and crankshaft mechanism is an efficient way of transforming rotary to reciprocating motion.

In one embodiment of the apparatus according to the invention the driving means further comprises a wind-mill or wind-turbine being electrically or mechanically coupled to the crankshaft.

In another embodiment of the apparatus, the driving means further comprises means for converting vertical movement of seawater to rotary motion of the crankshaft. The motion of seawater caused by waves, swell and tide is being used in many known proposals for the conversion of its energy. In this respect, reference is especially made to the International Patent Application No. WO 98/41758, in which examples of devices for conversion of energy from the vertical movement of seawater are described.

The converting means may comprise a structure being applied on the bottom of the sea and a floating body being movable in relation to the structure caused by the vertical movement of seawater and being mechanically coupled to the crankshaft. Preferably the mechanical coupling between the floating body and the crankshaft consists of a crank gear. Furthermore, the converting means may comprise a hollow body provided with at least one aperture in the wall thereof such that seawater is free to move into and out of the hollow body, and a floating body being movable in relation to the hollow body caused by the vertical movement of seawater and being in communication with the space in the hollow body in order to change the volume thereof causing a fluid flow inside the hollow body. The fluid flow can be used to directly drive the crankshaft with flywheel(s). It is also possible to indirectly drive the crankshaft by means of a fluid flow generated by the floating body moving in relation to the hollow body. In this case the converting means further comprises a turbine being coupled to a generator, such that the fluid flow rotates the turbine and the turbine drives the generator which in its turn generates electrical energy. The electrical energy is used to drive the crankshaft.

According to the invention the or each module of the apparatus further comprises preferably a suction valve provided in the inlet and/or a pressure valve provided in the connecting tube. On the upward stroke of the piston water will be sucked in through the suction valve in the inlet whilst the pressure valve to the column remains closed. On the downward stroke the suction valve in the inlet will close whilst the pressure valve to the column will open such that water is transferred through the connecting tube to the column in which it is stored. The stored column of water forms a pressure head which contains potential energy. When desired, this stored potential energy can be recovered and converted to electrical energy.

BRIEF DESCRIPTION OF THE DRAWINGS

The present invention will be described below in more detail with reference to the accompanied drawings, in which.

DETAILED DESCRIPTION OF THE PREFERRED EMBODIMENTS

Figure 1:
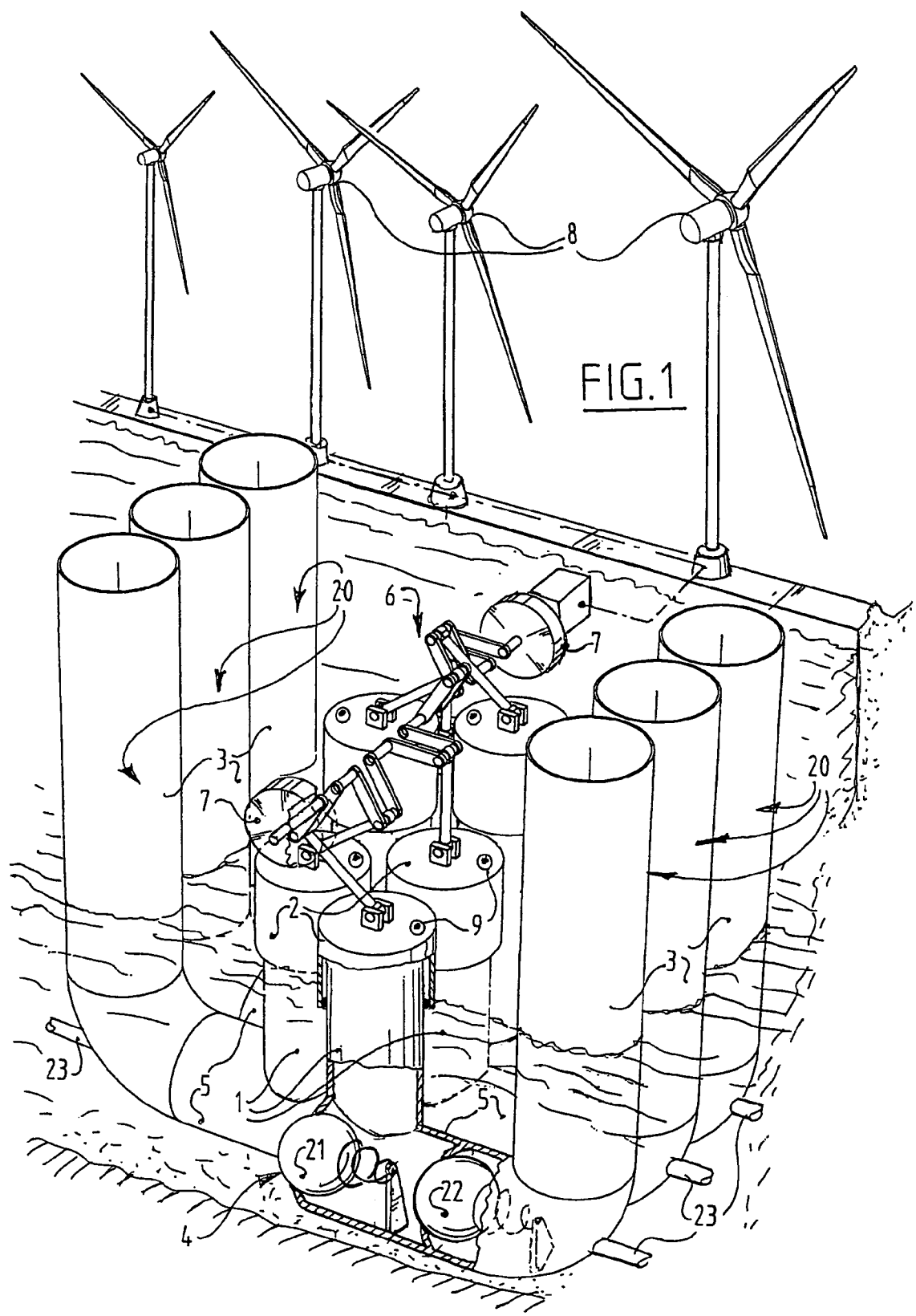
FIG. 1 shows a perspective view of a first embodiment of the apparatus according to the invention.
Figure 2:
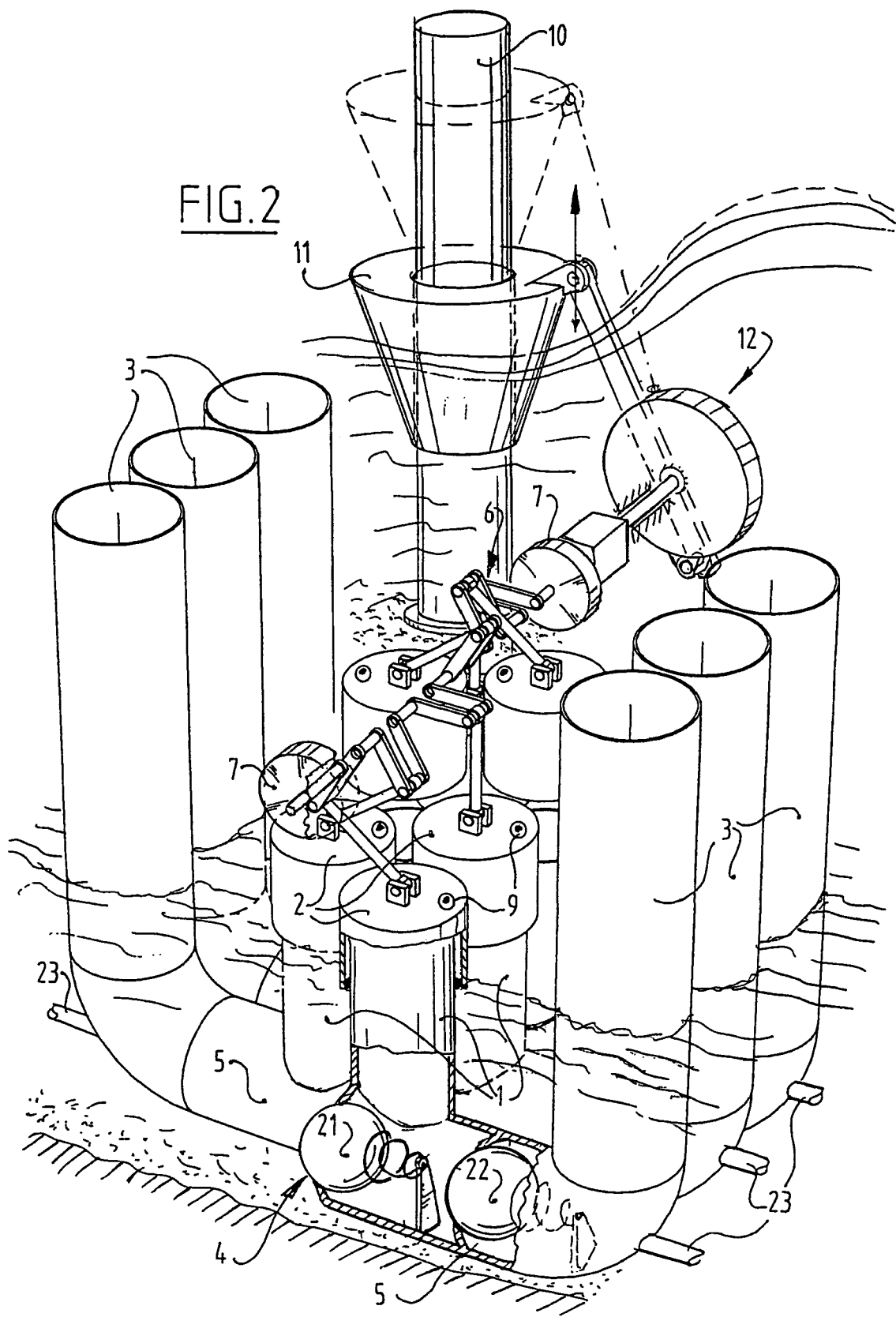
FIG. 2 shows a perspective view of a second embodiment of the apparatus according to the invention.
Figure 3:
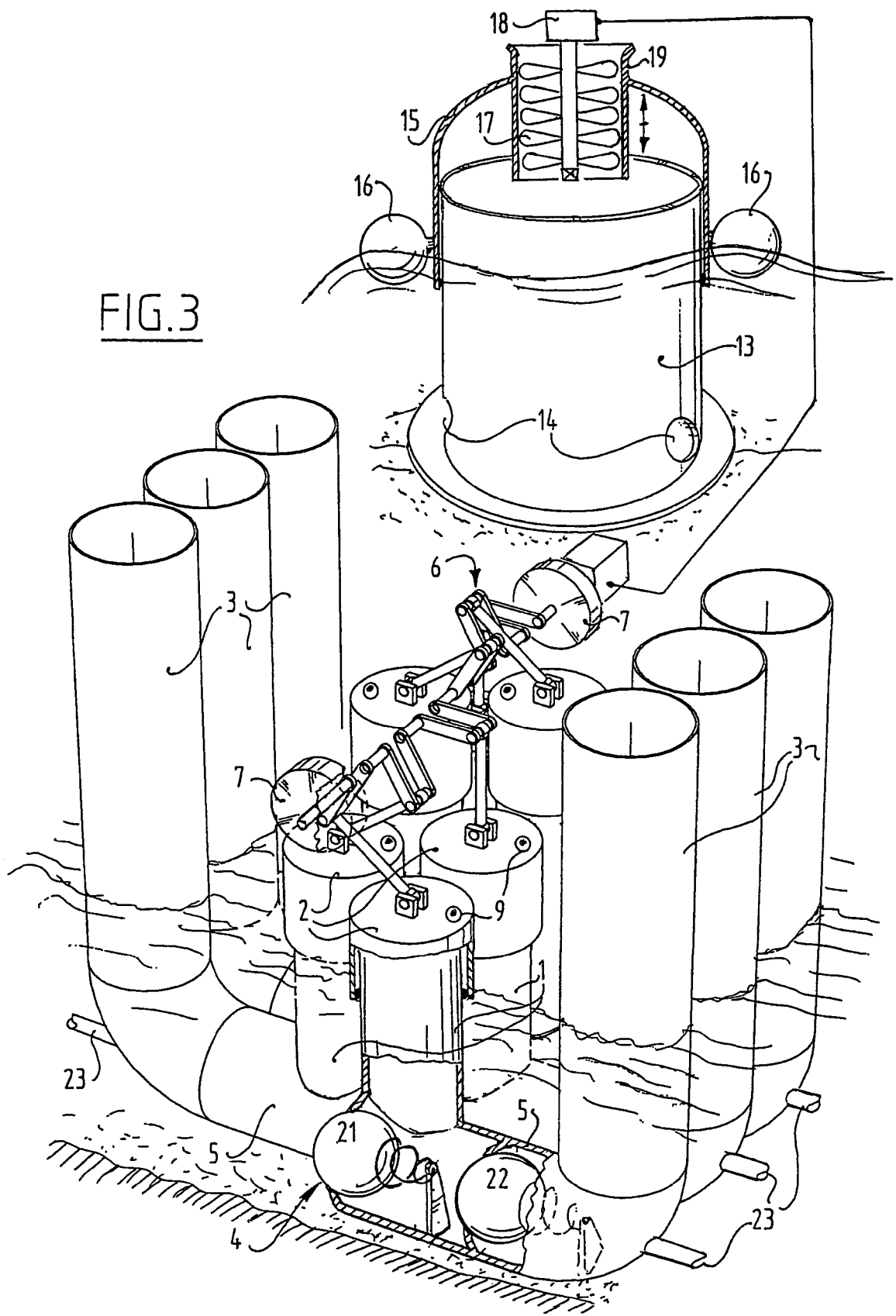
FIG. 3 shows a perspective view of a third embodiment of the apparatus according to the invention.

In FIG. 1 a first embodiment of an apparatus for storage of potential energy which uses water from a deep body of water, e.g. a sea, is shown. The apparatus comprises one or more modules 20. In the embodiments of FIGS. 1-3, the apparatus has six modules 20 placed in a symmetrical configuration. However, other configurations and more or less modules than six are also possible.

Each module 20 comprises a cylinder 1, a piston 2 being slidably connected to the cylinder 1, a column 3 for storing the water from the sea received through an inlet 4 being in communication with the cylinder/piston 1,2 and a connecting tube 5 which mutually connects the cylinder 1 and the column 3. Thereby, the apparatus comprises a crankshaft 6 being connected to the pistons 2 of the modules 20 and two flywheels 7 being mounted to the crankshaft 6 for reciprocally displacing the pistons 2 in relation to the cylinders 1. In the first embodiment there are provided windmills 8 being electrically or mechanically coupled to the crankshaft 6 to induce rotary motion thereof. Furthermore, each piston 2 is provided with an air valve 9 to left out air, which is trapped between the piston 2 and the water in the cylinder 1, before the apparatus is being employed.

In FIG. 2 a second embodiment of the energy storage apparatus is shown. For rotary motion of the crankshaft 6, the apparatus further comprises a structure 10 being applied on the bottom of the sea and a floating body 11 being movable in relation to the structure 10 caused by the vertical movement of seawater and being mechanically coupled to the crankshaft 6 by means of a crank gear 12. The structure 10 merely provides a guide for the floating body 11 surrounding it.

According to the third embodiment of FIG. 3, the apparatus comprises a hollow body 13 provided with two apertures 14 in the wall thereof such that seawater is free to move into and out of the hollow body 13. The apparatus further comprises a floating body which consists of a cap 15 for closing the top of the hollow body 13 and floaters 16 attached to the cap 15. The floating body 15,16 is movable in relation to the hollow body 13 caused by the vertical movement of seawater and is in communication with the space in the hollow body 13 in order to change the volume thereof causing a fluid flow inside the hollow body 13. Furthermore, a turbine 17 and generator 18 are applied in an outlet opening 19 of the cap 15 through which the induced fluid flow streams. The turbine/generator-unit 17,18 is electrically coupled to the crankshaft 6. So, in this case the fluid flow drives the crankshaft 6 indirectly via the turbine/generator-unit 17,18. Besides this, it is also possible to use the fluid flow for directly driving the crankshaft 6, wherein the turbine/generator-unit 17,18 can be omitted.

In all embodiments shown, each module 20 has a suction valve 21 in its inlet 4 and a pressure valve 22 in its connecting tube 5. Both valves 21,22 are one-way valves. Therefore, on the upward stroke of the pistons 2 by rotary motion of the crankshaft 6, water will be sucked in through the suction valve 21 whilst the pressure valve remains closed. On the downward stroke of the pistons 2 by rotary motion of the crankshaft 6, the suction valve 21 will close whilst the pressure valve 22 will open such that the sucked in water is transferred to the column 3 in which it is stored. The stored quantity of water in the column 3 forms a pressure head which contains potential energy. When desired, this stored potential energy can be recovered and converted to electrical energy. Each column 3 is provided with an outlet 23, wherein each or all (in series or parallel) of the outlets 23 is/are directed to a turbine/generator-unit (not shown in the figures) to convert the potential energy to electrical energy.

Although the modules 20 are depicted in FIGS. 1-3 to be applied on the bottom of the sea, it is possible to install these modules 20 on land and provide for a connection with the water in the sea or another water body.

The invention claimed is:

1. An apparatus for storage of potential energy using water from a deep body of water, comprising:
   (a) at least one module comprising a cylinder, a piston slidably connected to the cylinder, a column for storing water from the deep body of water received through an inlet in communication with the cylinder/piston, and a connecting tube which mutually connects the cylinder and the column, wherein the top of the column is open, and
   (b) a driving means for reciprocally displacing the piston in relation to the cylinder, wherein the connecting tube is at the level of the bottom of the column, such that water stored in the column forms a pressure head which contains potential energy, and wherein the driving means comprises a crankshaft drivingly connected to the piston and at least one flywheel mounted to the crankshaft for accumulating energy for counteracting the increasing pressure head.

2. The apparatus according to claim 1, wherein the driving means further comprises a windmill electrically coupled to the crankshaft.

3. The apparatus according to claim 1, wherein the driving means further comprises a wind turbine electrically coupled to the crankshaft.

4. The apparatus according to claim 1, wherein the driving means further comprises a windmill mechanically coupled to the crankshaft.

5. The apparatus according to claim 1, wherein the driving means further comprises a wind turbine mechanically coupled to the crankshaft.

6. The apparatus according to claim 1, wherein the driving means further comprises means for converting vertical movement of seawater to rotary motion of the crankshaft.

7. The apparatus according to claim 6, wherein the converting means comprises a structure applied on the bottom of the deep body of water and a floating body movable in relation to the structure caused by the vertical movement of water and being mechanically coupled to the crankshaft.

8. The apparatus according to claim 7, wherein the mechanical coupling between the floating body and the crankshaft consist of a crank gear.

9. The apparatus according to claim 6, wherein the converting means comprises a hollow body provided with at least one aperture in the wall thereof such that water is free to move into and out of the hollow body, and a floating body movable in relation to the hollow body caused by the vertical movement of water and in communication with a space in the hollow body in order to change the volume thereof causing a fluid flow inside the hollow body.

10. The apparatus according to claim 9, wherein the converting means further comprises a turbine coupled to a generator.

11. The apparatus according to claim 1, further comprising a suction valve provided in the inlet of each module.

12. The apparatus according to claim 1, further comprising a pressure valve provided in the connecting tube of each module.

* * * * *